United States Patent [19]
Yamamoto et al.

[11] Patent Number: 4,744,632
[45] Date of Patent: May 17, 1988

[54] PLASTIC OPTICAL FIBERS

[75] Inventors: Shozi Yamamoto, Ichihara; Hirokazu Kobayashi, Kameyama, both of Japan

[73] Assignee: The Furukawa Electric Co., Ltd., Tokyo, Japan

[21] Appl. No.: 52,123

[22] Filed: May 4, 1987

Related U.S. Application Data

[63] Continuation of Ser. No. 701,406, Feb. 14, 1985, abandoned.

[30] Foreign Application Priority Data

Feb. 17, 1984 [JP] Japan ............................ 59-26980

[51] Int. Cl.$^4$ .............................................. G02B 6/16
[52] U.S. Cl. ............................ 350/96.34; 350/96.23; 350/96.30
[58] Field of Search ............... 350/96.23, 96.29–96.31, 350/96.33, 96.34

[56] References Cited
U.S. PATENT DOCUMENTS 4,587,065 5/1986 Kouichi et al. ............. 350/96.31 X

OTHER PUBLICATIONS

Penn, "PVC Technology", 3rd Ed., Wiley Interscience, (New York . . . ), 1971, pp. 86, 136–137, 258–259.
Loadholt, J. T., "Development of a Flame Resistant Noncontaminating PVC Jacket for Coaxial Cable", U.S. Army Commun. Res. Dev. Command; Proceedings of the 29th International Wire and Cable Symposium, 245–252, 1980.

Primary Examiner—John Lee
Attorney, Agent, or Firm—Pearne, Gordon, McCoy & Granger

[57] ABSTRACT

This invention relates to plastic optical fibers comprising a plastic core and a plastic clad, a refractive index of the core being higher than that of the clad, and a cover of polyvinyl chloride to which 10–40 PHR of trimellitate plasticizers are added.

7 Claims, 2 Drawing Sheets

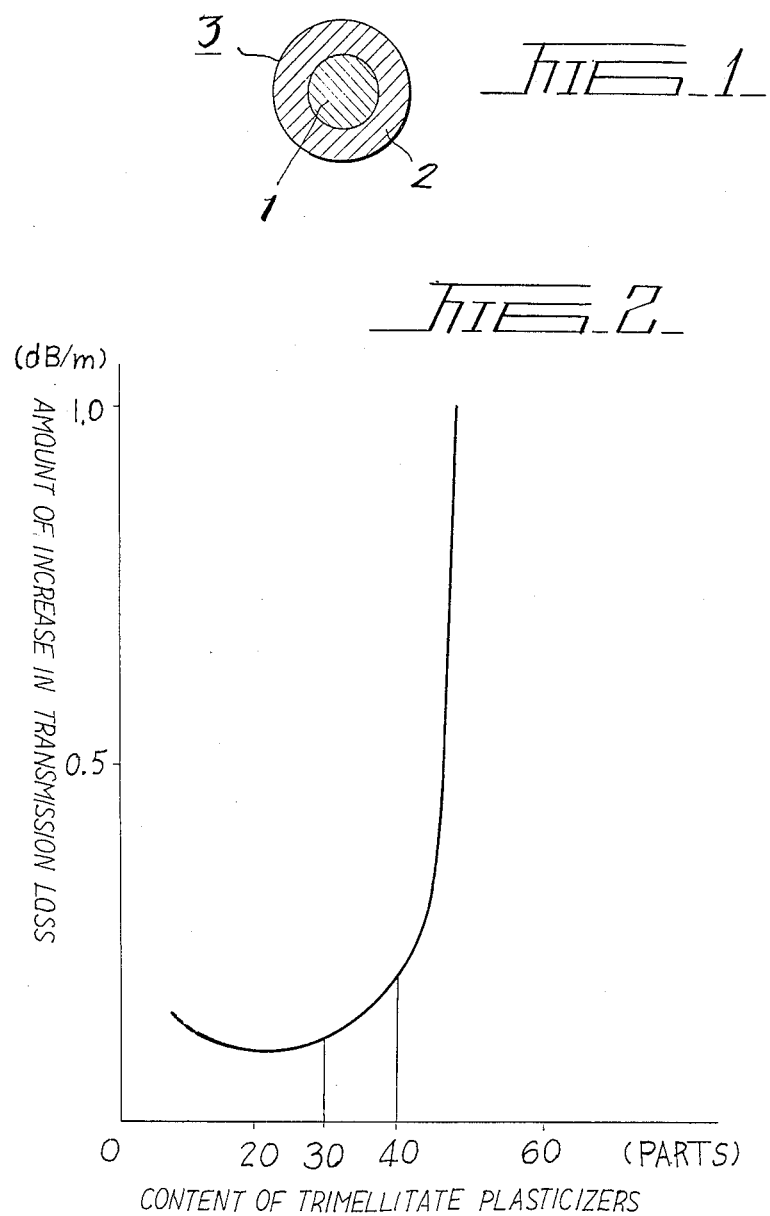

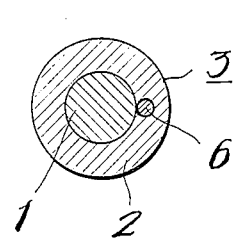
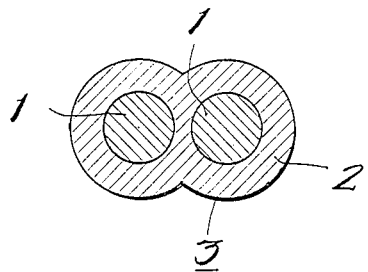
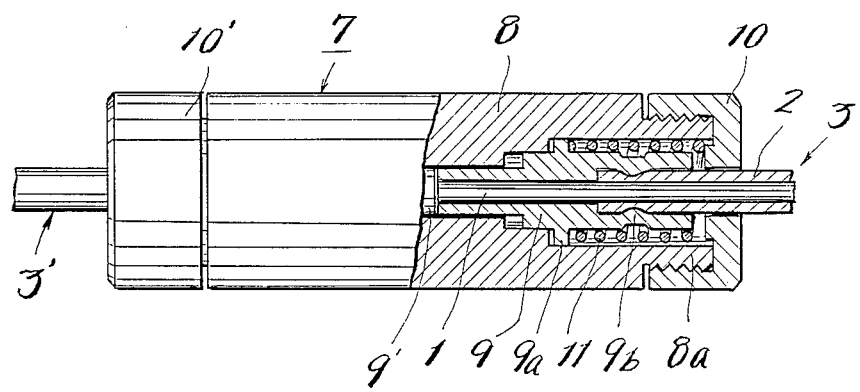

PLASTIC OPTICAL FIBERS

This is a continuation of application Ser. No. 701,406, filed on Feb. 14, 1985, now abandoned.

BACKGROUND OF THE INVENTION

Although plastic optical fibers comprising a plastic core and a plastic clad are poorer than glass optical fibers in transmission characteristics, the former are better than the latter in flexibility. Therefore, the plastic optical fibers have such advantages that they are easy to be bent and difficult to be folded, have a good shock resistance and are easily worked at their end faces. Accordingly, in case of short transmission distances of less than 10 m, the plastic optical fibers are often used because transmission loss is negligible.

In the prior art, the plastic optical fibers comprise a fiber body of a plastic core and a plastic clad and a cover of low density polyethylene, for example, provided on the fiber body. However, such plastic optical fibers have such drawbacks that they are easily burned, poor in both thermal and chemical resistance so that they are easily damaged by gasoline in case they are used as internal wiring for automobiles.

Therefore, it is proposed that polyvinyl chloride (referred to as PVC hereinafter), which is non-flammable material, is used as a cover for the fiber body instead of low density polyethylene. However, such optical fibers have a drawback that plasticizers included in the PVC migrate into the fiber body so that transmission characteristics are made poor as described by Japanese Utility Model Application Laying Open No. 74403/1982.

Alternatively, there are proposed by Japanese Utility Model Application Publication No. 7362/1983 plastic optical fibers having dual covers of a first layer of saponified copolymer of ethylene and vinyl acetate and a second layer of non-flammable material. However, such optical fibers require two covering steps so as to be expensive to produce. Although they can be produced by one step, it requires two extruders, which causes the apparatus to be complicated.

SUMMARY OF THE INVENTION

Accordingly, it is a principal object of the invention to provide plastic optical fibers adapted to be produced by one step.

It is another object of the invention to provide plastic optical fibers having excellent non-flammability, thermal resistance and chemical resistance.

It is another object of the invention to provide plastic optical fibers adapted to form a connector having a good physical strength.

In accordance with the present invention, there are provided plastic optical fibers comprising a plastic core and a plastic clad, a refractive index of the core being higher than that of the clad, and a cover of polyvinyl chloride to which 10–40 PHR of trimellitate plasticizers are added.

BRIEF DESCRIPTION OF THE DRAWINGS

The above and other objects and features of the invention will be apparent from the detailed description of the embodiment taken along with reference to the accompanying drawings in which;

FIG. 1 is a cross sectional view of a plastic optical fiber constructed in accordance with one embodiment of the invention;

FIG. 2 illustrates a graph showing a relation of amount of increase in transmission loss of the plastic optical fiber relative to the extent of trimellitate plasticizers included in the PVC of a cover in the invention;

FIG. 3 is a cross sectional view of a sample for testing non-flammability;

FIG. 4 is a cross sectional view of an example of the invention;

and FIG. 5 is a side elevational view of a connector of plastic optical fibers of the invention with a portion shown in cross section.

DETAILED DESCRIPTION OF THE PREFERRED EMBODIMENTS

Referring now to FIG. 1, there is shown a plastic optical fiber 3 constructed in accordance with the invention. The plastic optical fiber 3 comprises a fiber body 1 including a plastic core and a plastic clad and a cover 2 of polyvinyl chloride (PVC) to which 10–40 PHR of trimellitate plasticizers are added. A refractive index of the core should be higher than that of the clad. With the cover 2 of PVC including trimellitate plasticizers, the plastic optical fiber 3 has an excellent non-flammability, thermal resistance and chemical resistance, and also has these qualities maintained as stable for a longer time.

This will be noted from the Table I which shows some results of our test and some comparisons with respect to an amount of increase in transmission loss relative to cover materials. In the Table, PVC-A corresponds to PVC including 20 parts of tri-(2-ethylhexyl) trimellitate, PVC-B corresponds to PVC including 30 PHR of tri-(2-ethylhexyl) trimellitate and PVC-C corresponds to PVC including 50 PHR of tri-(2-ethylhexyl) trimellitate. Furthermore, PVC-D corresponds to PVC having no trimellitate added thereto and including other plasticizers of 30 PHR of dioctylphthalate and 20 parts of chloridized fatty acid ester and PVC-E corresponds to PVC having no trimellitate added thereto and including other plasticizers of 10 parts of dioctylphthalate and 10 parts of dioctyl adipate. This table also shows two cover materials of low density polyethylene (referred to as LDPE hereinafter). One of the LDPE materials is normal LDPE while another is non-flammable LDPE.

TABLE I

| | PVC-A | PVC-B | PVC-C | PVC-D | PVC-E | Normal LDPE | Non-flammable LDPE |
|---|---|---|---|---|---|---|---|
| Inflammability | | | | | | X | |
| Thermal resistance | | | | | | | |
| (80° C. × 30 days) | 0 | 0 | 0.2 | 0.2 | 0.1 | 0.1 | 1.0 |
| (90° C. × 30 days) | 0 | 0 | 0.5 | 0.5 | 0.2 | 0.4 | Unable (X) |
| (100° C. × 30 days) | 0.1 | 0.12 | 1.0 | 1.2 | 0.3 | 0.6 | Unable |
| Chemical resistance | | | | | | | |
| (50° C. × 20 H) | | | | | | | |
| (Brake oil) | 0 | 0 | 0 | 0 | 0 | 0 | 0 |
| (Gasoline) | 0.2 | 0 | 0 | 0 | 0.3 | Unable | 0.4 |

TABLE I-continued

|  | PVC-A | PVC-B | PVC-C | PVC-D | PVC-E | Normal LDPE | Non-flammable LDPE |
|---|---|---|---|---|---|---|---|
| (H$_2$SO$_4$ 36.4 wt %) | 0 | 0 | 0 | 0.3 | 0.5 | 0 | 0 |
| (Salt water) | 0 | 0 | 0 | 0 | 0.6 | 0 | 0 |
| (Engine oil) | 0 | 0 | 0 | 0 | 0 | 0 | 0 |

In this table, an amount of transmission loss is indicated by dB/m and "Unable" indicated by ✗ means "unable to be determined."

FIG. 2 shows a graph of increase in transmission loss of PVC-A, PVC-B and PVC-C having thermal resistance (100° C. × 30 days) in the Table I. Non-flammability in the Table I is the result of testing by JIS C 3005 (suspended horizontally) the plastic optical fibers 3 of FIG. 3 having high tensile fibers 6 of 250 denier provided in the cover 2 in a longitudinal manner. As noted from the Table I, all the covers except normal LDPE have passed in the non-flammability. As also noted from the Table I, the covers of normal LDPE and non-flammable LDPE are poor in thermal resistance while the covers of PVC-D and PVC-E having no trimellitate plasticizers added thereto are poor in thermal resistance and chemical resistance. Furthermore, as noted from FIG. 2, even though the covers have trimellitate plasticizers added thereto, if the amount of addition exceeds 40 PHR, the amount of increase of transmission loss of the plastic optical fibers suddenly increases. FIG. 5 shows the covers 2 mounted on a ferrule 9 of a connector 7 by compression by a caulking tool. The connector 7 comprises a housing 8, two ferrules 9 and 9' through which two plastic optical fibers 3 and 3' extend and caps 10 and 10' threadedly engage the housing 8 at both ends. The ferrules 9 and 9' hold the plastic optical fibers 3 and 3' by deforming the ferrules 9 and 9' so as to protrude them into the covers 2. The ferrules 9 and 9' are urged by springs 11 provided between flanges 9a and the caps 10 and 10' so as to abut the end faces of the fiber bodies 1 of the plastic optical fibers 3 and 3' against each other. Table II shows properties of drawing force of the plastic optical fibers 3 relative to the ferrule 9 with respect to the covers of PVC-A, PVC-B and PVC-C, respectively. In the Table II, what is meant by the drawing force is the minimum force by which the plastic optical fibers 3 are drawn out of the ferrule 9. Furthermore, what is meant by variation in the drawing force is the maximum value of differences between the test values and the average value in the tests. What is meant by inferiority in rate of occurrence of inferiority is the products having increase in loss of more than 1.0 db at the compressed portion 9b of the connector 7.

TABLE II

|  | PVC-A | PVC-B | PVC-C |
|---|---|---|---|
| Drawing force (kg) | 14.0 | 12.5 | 11.0 |
| Variation in drawing force | 0.8 | 1.4 | 1.8 |
| Rate of occurrence of inferiority (%) | 0.5 | 0.5 | 1.5 |
| Synthetic evaluation | good | good | bad |

As noted from the Table II, the priority of calking is not preferable in case of more than 30 parts of trimellitate plasticizers included in the PVC. It should be understood that if PVC has less than 5 PHR of trimellitate plasticizers added thereto, then it will be difficult to extrude cover materials of PVC to form the cover. Thus, it will be noted from the foregoing that the amount of addition of trimellitate plasticizers should essentially range from 10 to 40 PHR in view of workability, thermal resistance, chemical resistance and non-flammability and preferably from 10 to 30 PHR also in view of drawing force of the plastic optical fibers in the connector.

FIG. 4 shows another example of the invention in which an assembly 3 of two or more than two plastic fiber bodies 1 has the cover 2 of PVC to which 10–40 PHR of trimellitate plasticizers are added.

As noted from the foregoing, the plastic optical fibers of the invention having the cover of PVC to which 10–40 PHR of trimellitate plasticizers are added are excellent in non-flammability, thermal resistance and chemical resistance and can be produced by one step because of a single layer of the cover. Furthermore, it will be noted that they can be connected with high physical strength.

While some preferred embodiments of the invention have been illustrated and described with reference to the accompanying drawings, it will be understood by those skilled in the art that they are by way of examples, and that various changes and modifications may be made without departing from the spirit and scope of the invention, which is intended to be defined only by the appended claims.

What is claimed is:

1. Plastic optical fibers comprising a plastic core and a plastic clad, the core having a refractive index higher than that of the clad, and a cover of polyvinyl chloride to which 10–40 PHR of trimellitate plasticizers are added.

2. Plastic optical fibers as set forth in claim 1, wherein the amount of addition of said trimellitate plasticizers ranges from 10 to 30 PHR.

3. Plastic optical fibers as set forth in claim 1, wherein said plastic optical fibers are in the form of a single fiber.

4. Plastic optical fibers as set forth in claim 1, wherein said plastic optical fibers are in the form of assembled fibers.

5. Plastic optical fibers as set forth in claim 1, wherein the maximum of 40 PHR of trimellitate plasticizer inhibits increase of transmission loss of the plastic optical fibers.

6. Plastic optical fibers comprising a plastic core and a plastic clad, the core having a refractive index higher than that of the clad, and a cover of polyvinyl chloride to which 10–40 PHR of trimellitate plasticizers are added, wherein the maximum of 40 PHR of trimellitate plasticizer inhibits the increase of transmission loss of the plastic optical fibers.

7. A plastic optical fiber comprising a plastic core; a plastic clad covering said plastic core; the refractive index of said plastic core being higher than that of said clad; a single cover of polyvinyl chloride covering said clad; and said cover containing trimellitate plasticizer in a minimum amount of 10 PHR for flexibility and a maximum amount of 40 PHR to inhibit increase in transmission loss of the plastic optical fiber due to higher temperature ambient conditions of up to 100° C.

* * * * *